United States Patent [19]
Fukushima et al.

[11] Patent Number: 5,391,126
[45] Date of Patent: Feb. 21, 1995

[54] TOROIDAL TYPE CONTINUOUSLY VARIABLE TRANSMISSION

[75] Inventors: Hiroshi Fukushima, Ayase; Hisashi Machida, Fujisawa, both of Japan

[73] Assignee: NSK Ltd., Tokyo, Japan

[21] Appl. No.: 95,014

[22] Filed: Jul. 22, 1993

[30] Foreign Application Priority Data

Aug. 5, 1992 [JP] Japan .................. 4-060209[U]
Oct. 28, 1992 [JP] Japan .................. 4-080261[U]

[51] Int. Cl.⁶ ...................... F16H 15/38; F16C 33/46
[52] U.S. Cl. .................................. 476/46; 384/614
[58] Field of Search ............... 476/40, 41, 42, 46; 384/527, 609, 611, 614

[56] References Cited

U.S. PATENT DOCUMENTS

| | | | |
|---|---|---|---|
| 2,665,958 | 1/1954 | Waldherr, Jr. | 384/527 |
| 3,159,042 | 12/1964 | Kraus | 476/46 X |
| 4,694,704 | 9/1987 | Kraus | 476/46 X |
| 4,909,092 | 3/1990 | Machida et al. | |
| 4,955,246 | 9/1990 | Nakano | 476/46 |

FOREIGN PATENT DOCUMENTS

| | | | |
|---|---|---|---|
| 40810 | 10/1908 | Austria | 384/614 |
| 2518324 | 11/1976 | Germany | 384/527 |
| 62-71465 | 5/1987 | Japan . | |
| 1-275950 | 11/1989 | Japan | 476/46 |

*Primary Examiner*—Allan D. Herrmann
*Attorney, Agent, or Firm*—Shapiro and Shapiro

[57] ABSTRACT

A toroidal type continuously variable transmission is provided which allows the outer peripheral face of power rollers to be processed by industrial techniques, and prevents an outer ring and a retainer from rubbing against an input side concave surface or an output side concave surface. The outer peripheral face of the power roller is formed of a spherical surface portion and a cylindrical surface portion continuous from a larger diameter side of the spherical surface portion, and the outer diameter of the cylindrical surface portion is selected to be longer than the outer diameter of the outer ring and the outer diameter of the retainer.

5 Claims, 9 Drawing Sheets

TOROIDAL TYPE CONTINUOUSLY VARIABLE TRANSMISSION

BACKGROUND OF THE INVENTION

1. Field of the Invention

The present invention relates to a toroidal type continuously variable transmission which can be utilized as a transmission for an automobile and other machines.

2. Related Background Art

Figure 2A:
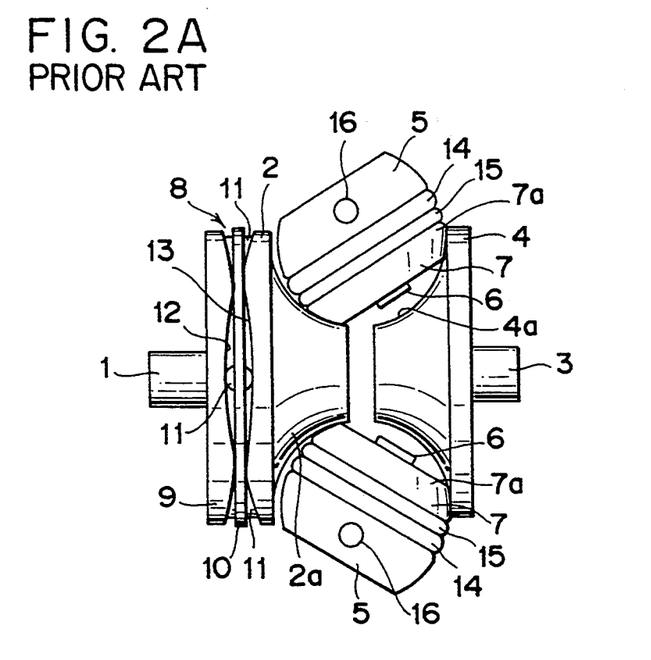
FIGS. 2A and 2B are lateral views showing a basic structure of a toroidal type continuously variable transmission in a maximally decelerated state and in a maximally accelerated state, respectively.
Figure 2B:
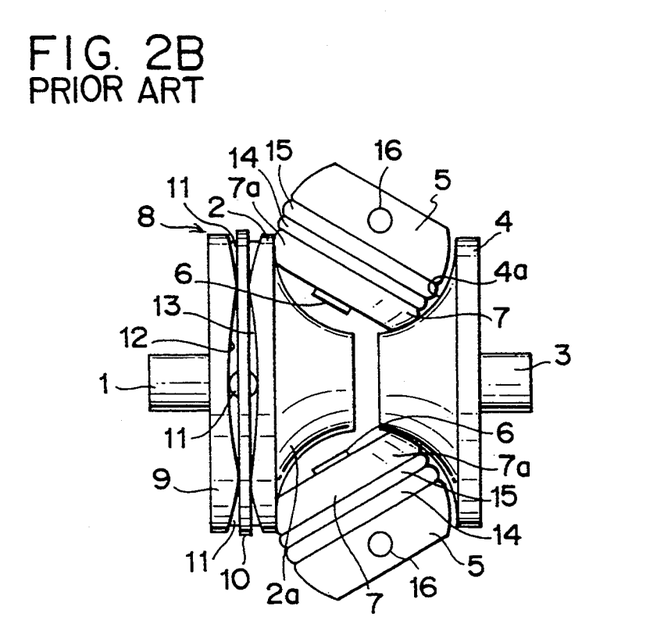

A toroidal type continuously variable transmission as shown in FIGS. 2A and 2B has been investigated as a transmission for an automobile. This toroidal type continuously variable transmission has an input side disk 2 supported concentrically with an input shaft 1 and an output side disk 4 fixed to an end portion of an output shaft 3, as disclosed, for example, in Japanese Laid-Open Utility Model Application No. 62-71465. On the inner surface of a casing which accommodates the toroidal type continuously variable transmission or on a supporting bracket disposed in this casing, there are provide trunnions 5 which swing about pivots 16 located at twisted positions with respect to the input shaft 1 and the output shaft 3, respectively.

Each of the trunnions 5 is made of a metal material having a sufficient rigidity and provided with the pivots 16 mounted on the outer surface of both ends. Also, around displacement shafts 6, each disposed in a central portion of each trunnion 5, power rollers 7 are rotatably supported. Each of the power rollers 7 is sandwiched between the input side and output side disks 2, 4.

The side surfaces in the axial direction of the input side and output side disks 2, 4, opposite to each other, are formed with an input side concave surface 2a and an output side concave surface 4a, respectively, the cross-section of which is arcuate with the center being on the corresponding pivots 16. Then, the outer peripheral faces 7a of the respective power rollers 7 formed in spherical convex surfaces abut the input side concave surface 2a and the output side concave surface 4a of the disks 2, 4, respectively.

Between the input shaft 1 and the input side disk 2, there is provided a loading cam type pressurizing unit 8 with which the input side disk 2 is resiliently urged to the output side disk 4. This pressurizing unit 8 comprises a cam plate 9 arranged for rotation together with the input shaft 1 and a plurality of (for example, four) rollers 11 retained by a retainer 10. On one side face of the cam plate 9 (the right side face in FIG. 2), there is formed a cam plane 12 which presents unevenness in the circumferential direction. A similar cam plane 13 is also formed on the outer side face (the left side face in FIG. 2) of the input side disk 2. The plurality of rollers 11 are arranged rotatably about an axis in the radial direction with respect to the center of the input shaft 1.

When rotation of the input shaft 1 causes the cam plate 9 to rotate, the plurality of rollers 11 are urged onto the cam plane 13 on the outer side face of the input side disk 2. As a result, the input side disk 2 is urged by the plurality of power rollers 7, and simultaneously the input side disk 2 is rotated on the basis of the engagement of the pair of cam planes 12, 13 with the plurality of rollers 11. Then, the rotation of the input side disk 2 is transmitted to the output side disk 4 through the plurality of power rollers 7, which causes rotation of the output shaft 3 fixed to the output side disk 4.

Figure 1:
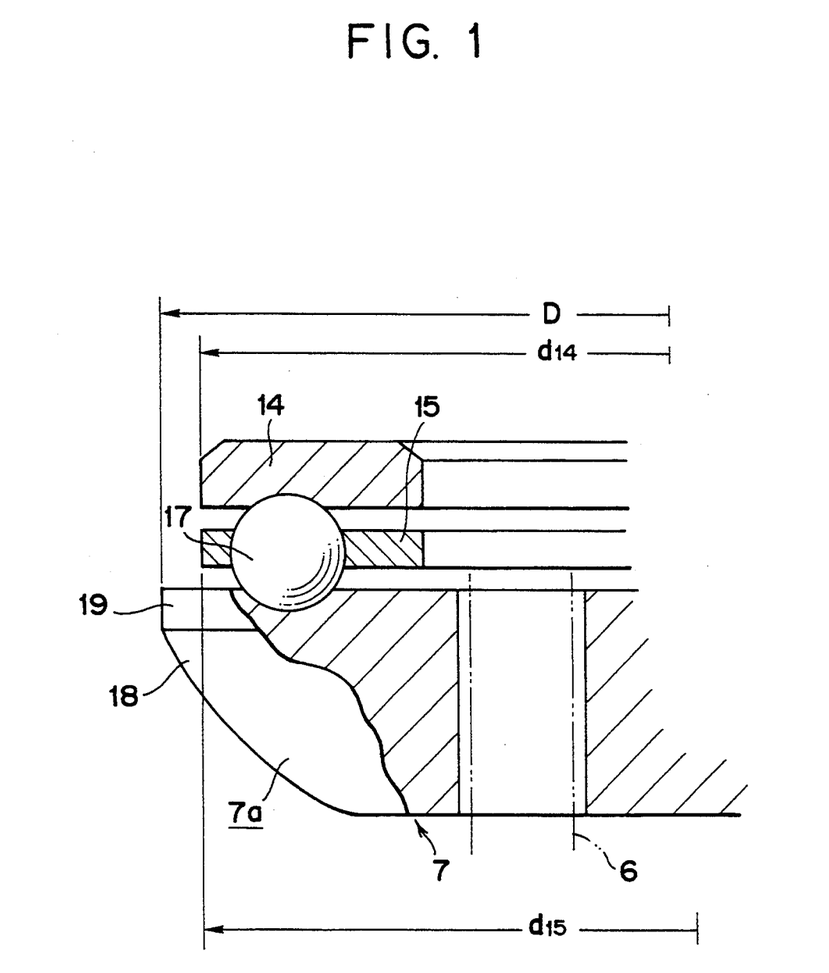
FIG. 1 is a cross-sectional view showing part of a power roller which is incorporated in a toroidal type continuously variable transmission according to the present invention.

Outer rings 14 are mounted to base end portions of the respective displacement shafts 6 such that a plurality of rolling bodies 17 (normally balls. See FIG. 1 showing an embodiment of the present invention) are retained in annular retainers 15 disposed between the outer rings 14 and the power rollers 7 such that they can freely roll, allowing each of the power rollers 17 to be rotatable relative to the corresponding outer ring 14. Also, though not shown, a plurality of rolling bodies (normally needles) are provided also between the outer peripheral face of each of the displacement shafts 6 and the inner peripheral face of each of the power rollers 7 to arrange the respective power rollers 7 for rotation relative to the corresponding displacement shafts 6.

Consider now that the rotational speed between the input shaft 1 and the output shaft 3 is changed. First, when the speed between the input shaft 1 and the output shaft 3 is decreased, the respective trunnions 5 are swung about the pivots 16 as shown in FIG. 2A to incline the respective displacement shafts 6 such that the outer peripheral faces 7a of the respective power rollers 7 abut a portion near the center of the input side concave surface 2a and a portion near the outer periphery of output side concave surface 4a, respectively.

Conversely, when the speed is increased, the trunnions 5 are swung as shown in FIG. 2B to incline the respective displacement shafts 8 such that the outer peripheral faces 7a of the respective power rollers 7 abut a portion near the outer periphery of the input side concave surface 2a and a portion near the center of the output side concave surface 4a, respectively. If the inclination angle of the displacement shafts 6 is adjusted to be an intermediate value between those shown in FIGS. 2A and 2B, an intermediate transmission gear ratio can be achieved between the input shaft 1 and the output shaft 3.

For the toroidal type continuously variable transmission constructed and operated as described above to exhibit a desired transmission performance, the input side concave surface 2a, the output side concave surface 4a, and the outer peripheral faces 7a of the respective power rollers 7 must be formed in spherical surfaces as desired in order to ensure that power is transmitted between contacted surfaces. However, with the power rollers 7 incorporated in conventional toroidal type continuously variable transmission, positioning of the outer peripheral faces 7a is extremely difficult when they are subjected to a grinding process. It is therefore difficult to finish the outer peripheral faces 7a to have exact spherical convex surfaces by utilizing industrial mass-production techniques.

Also, in operation of the toroidal type continuously variable transmission, the displacement shafts 6 may suffer from elastic deformation so that the power rollers 7 supported by end portions of the respective displacement shafts 6 and the outer rings 14 are inevitably displaced to the direction perpendicular to the respective displacement shafts 6. In this event, it is necessary to prevent the outer peripheral faces of the respective outer rings 14 from coming in contact with the input side concave surface 2a and the output side surface 4a to protect the respective concave surfaces 2a, 4a from being damaged, from a viewpoint of ensuring the durability of the toroidal type continuously variable transmission.

However, the conventionally proposed toroidal type continuously variable transmissions have been manufactured without the consideration of the above stated problems. Therefore, if the respective displacement shafts 6 are elastically deformed in a condition that the displacement shafts 6 are largely inclined, and the outer peripheral faces of the respective outer rings 14 are opposed to the input side concave surface 2a or the outer side concave surface 4a, as shown in FIGS. 2A and 2B, the outer peripheral edges of the respective outer rings 14 rub against the input side concave surface 2a or the output side concave surface 4a, which may result in that the respective concave surfaces 2a, 4a are damaged.

Figure 4:
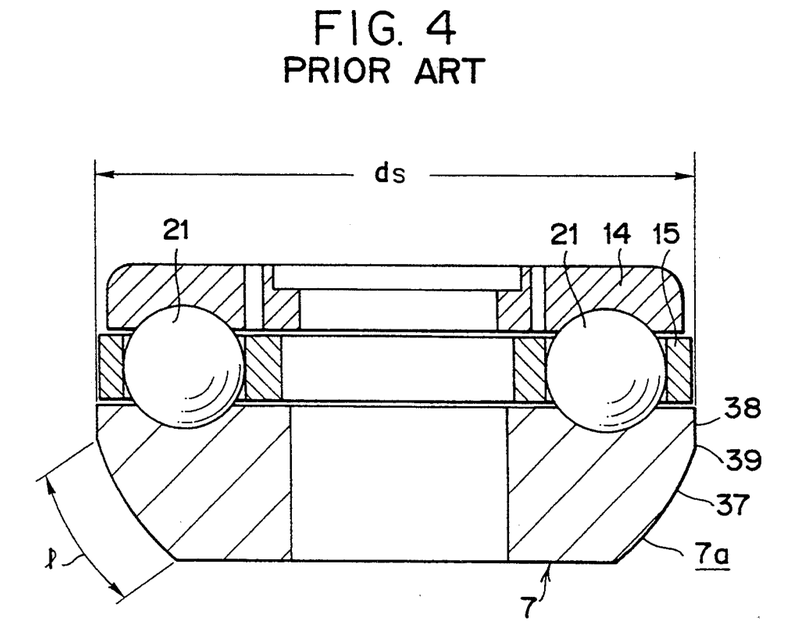
FIG. 4 is a cross-sectional view showing a power roller incorporated in a conventional toroidal type continuously variable transmission together with a thrust bearing.

Further, the outer peripheral faces 7a of the power rollers 7 are made in a spherical convex surface so that they are allowed to contact the respective concave surfaces 2a, 4a. For forming such a spherical convex surface using a processing machine such as a grinding machine, it is necessary, to hold the power rollers 7 on a holder of a shoe type. For this reason, in the past, the outer peripheral face 7a of the power roller 7 has been formed of a spherical surface portion 37 and a cylindrical surface portion 38, as shown in FIG. 4. The center of the spherical surface portion 37 is located on the center line of the pivot 16, while the center of the cylindrical surface portion 38 is made coincident with the center of the displacement shaft 6. When the spherical surface portion 37 is processed, the cylindrical surface portion 38 must be held by a holder of a processing machine.

One toroidal type continuously variable transmission of the present invention achieves a reduction of a risk that corner portions of the power rollers 7 come in contact with the input side concave surface 2a or the output side concave surface 4a to improve the durability thereof.

Assume that the spherical surface portion 37 and the cylindrical surface portion 38 continuous from one end of the spherical surface portion 37 are formed on the outer peripheral face 7a of the power roller 7, as the conventional structure shown in FIG. 4. With the same size of the power roller, it is inevitable that the length 1 of the bus line of the spherical surface portion 37 becomes shorter than that without the cylindrical surface portion 38.

In operation of the toroidal type continuously variable transmission, the spherical surface portion 37 comes in contact with the input side concave surface 2a and the output side concave surface 4a in an elliptic portion (contact ellipse), the major axis of which extends in the direction of the bus line of the spherical surface portion 37. In a normal operating state, the major axis of the contact ellipse is short so that the contact ellipse will not extend beyond the spherical surface portion 37. However, if a torque transmitted by the toroidal type continuously variable transmission becomes excessive by some reason, it can be thought that one end portion in the major axis direction of the contact ellipse extends beyond the spherical surface portion 37.

If the contact ellipse extends beyond the spherical surface portion 37, an edge 39 existing in a boundary between the spherical surface portion 37 and the cylindrical surface portion 38 comes in contact with the input side concave surface 2a and the output side concave surface 4a. In this manner, if the sharp edge 39 is in contact with the respective concave surfaces 2a, 4a, parts of the respective concave surfaces 2a, 4a are applied with excessive stresses, resulting in a risk that the concave surfaces 2a, 4a are damaged by the sharp edge 39.

Figure 11:
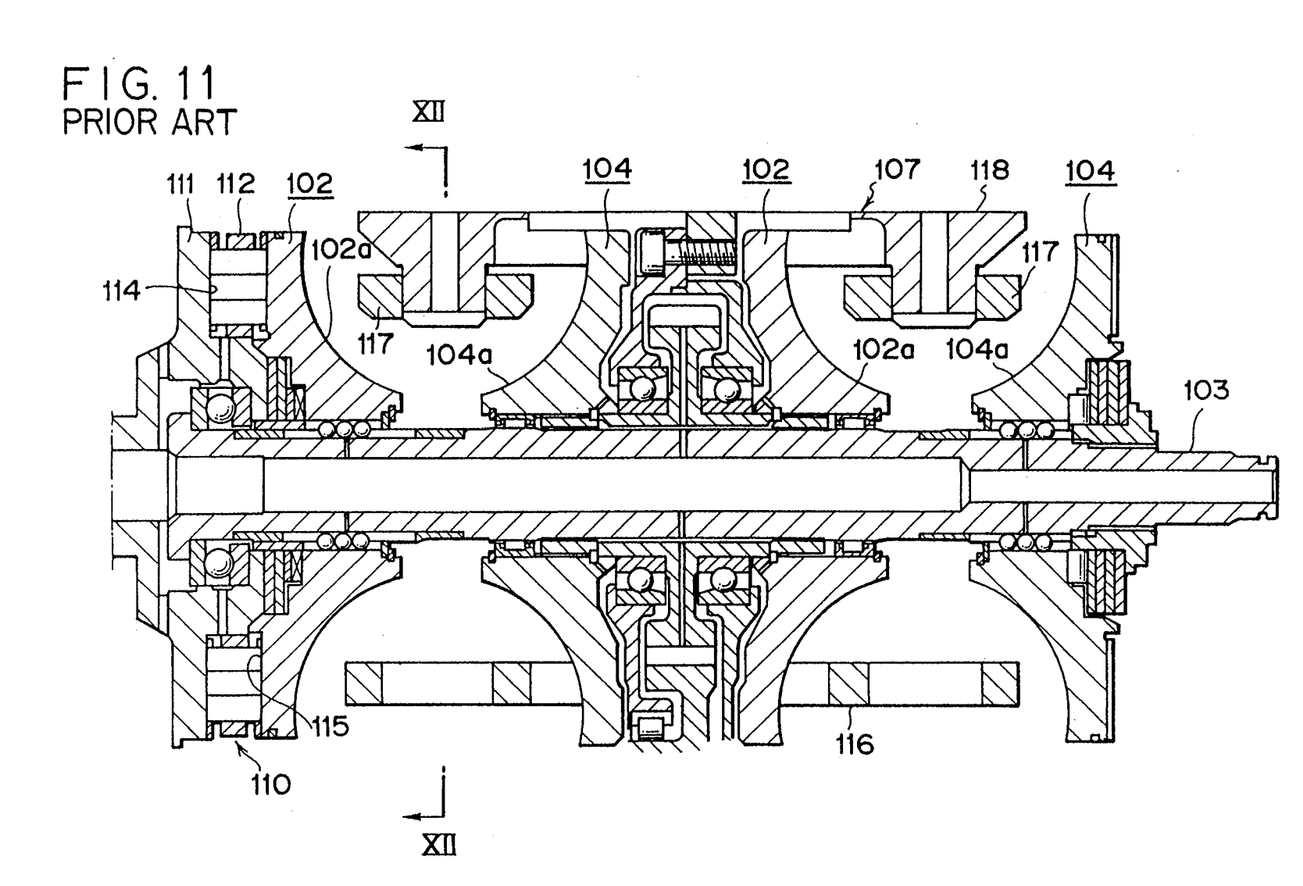
FIG. 11 is a partial cross-sectional view showing an example of an actual toroidal type continuously variable transmission.
Figure 12:
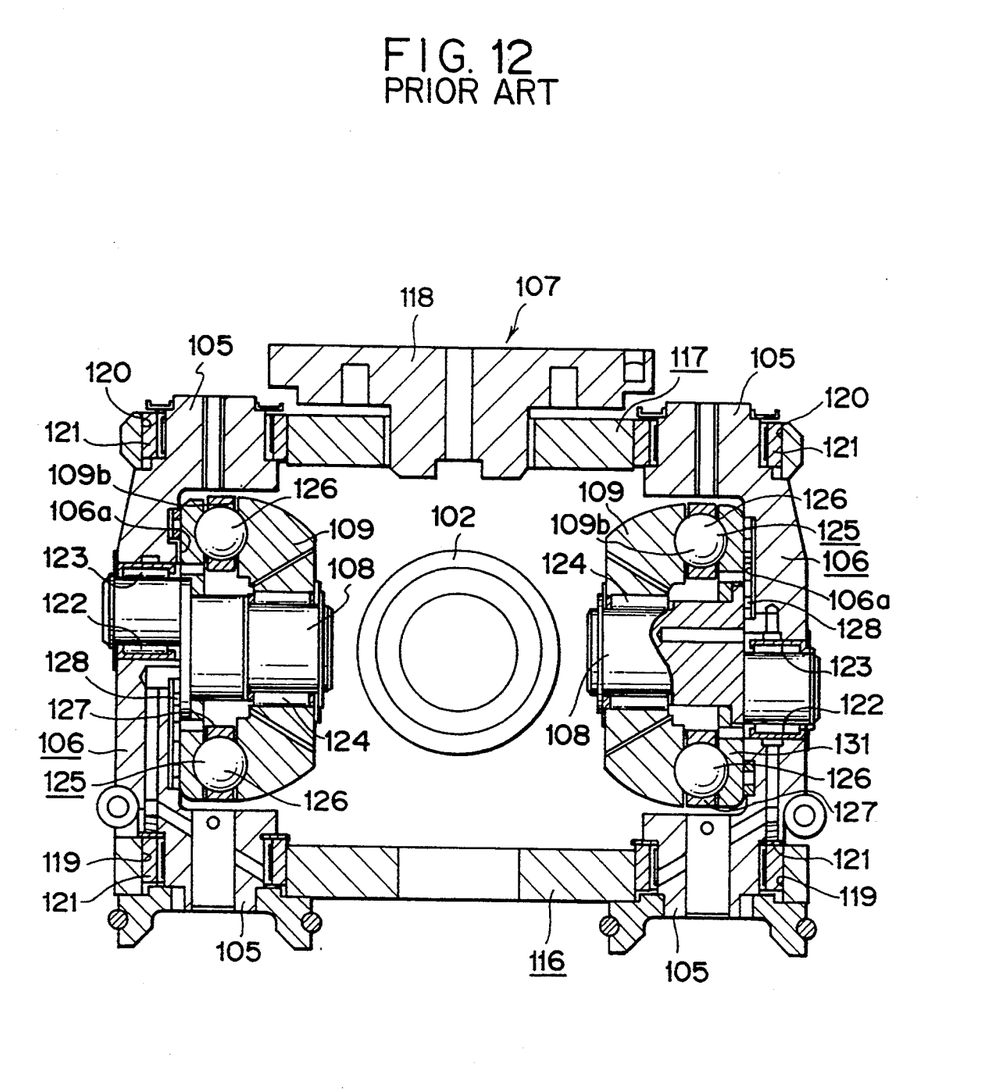
FIG. 12 is a cross-sectional view taken along the line XII—XII of FIG. 11.

FIGS. 11 and 12 shows an example of toroidal type continuously variable transmissions which are actually used as a transmission for automobile or the like. The structure shown in FIGS. 11, 12 includes two sets of the toroidal type continuously variable transmissions having a basic structure as shown in FIGS. 2A and 2B which are arranged in parallel with each other. This is because as much power as possible can be transmitted as a whole, while one of the two toroidal type continuously variable transmission sets is prevented from being applied with an excessive load.

Referring in detail to FIGS. 11, 12, trunnions 106 are supported by a supporting member 107. This supporting member 107 is constructed of a lower link 116, two upper links 117, and an upper link post 118, which are combined with one another. Inside of circular holes 119, 120 formed through four corner portions of the lower link 116 and through both end portions of the upper links 117, respective pivots 105 arranged in both ends of the trunnions 106 are pivotably supported through roller bearings 121.

Also, inside of circular holes 122 formed in an intermediate portions of the respective trunnions 106, respective base ends of displacement shafts 108 are rotatably supported through radial bearings 123. Further, each of the power rollers 109 is rotatably supported by the top end of each of the displacement shafts 108 through another radial bearing 124. A pair of thrust bearings 125 are disposed between opposing side surfaces 106a of the trunnions 106 and end surfaces 109b of the power rollers 109, so that thrust loads applied to the respective power rollers 109 can be supported by the respective trunnions 106.

Each of the thrust bearings 125 is constructed of an outer ring 131, a plurality of balls 126, and a retainer 127 for retaining the plurality of balls 126 such that these balls 126 can freely roll. The outer surface of the outer ring 131 abuts the side surfaces 106a of the trunnions 106 through a thrust needle bearing 128, while the plurality of balls 126 are held between an outer annular trajectory formed in the inner surface of the outer ring 131 and an inner annular trajectory formed in the end surfaces 109b of the power rollers 109.

Figure 9:
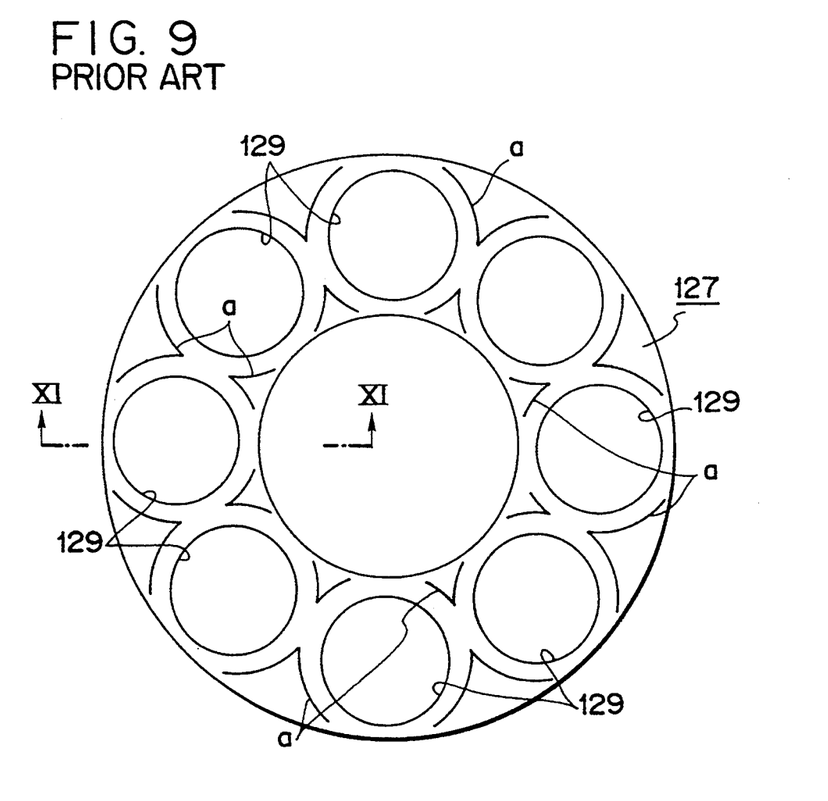
FIG. 9 is a plan view showing a conventionally used retainer.
Figure 10:
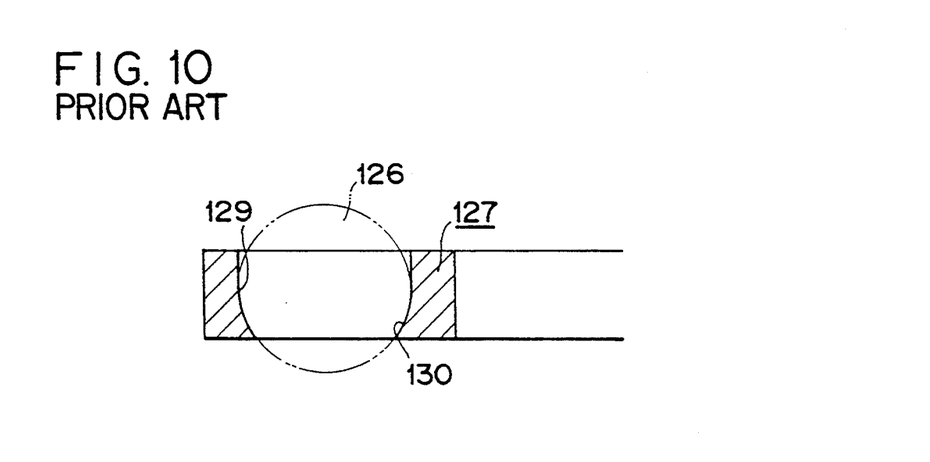
FIG. 10 is an enlarged cross-sectional view taken along the line X—X of FIG. 9.

The retainer 127 is implemented by a so-called machined retainer made of a metal plate of a material such as HBsCl (high tension brass) which is formed in a ring shape as shown in detail in FIGS. 9, 10, and provided with a plurality of circular pockets 129 at equally spaced positions in the circumferential direction of the metal plate. The inner diameter of an opening at one end (the lower end in FIG. 10) of each pocket 129 is made shorter than the outer diameter of the balls 126 and the inner diameter of an opening at the other end (the upper end in FIG. 10) thereof. On the inner surface of the opening at the one end, there is formed a curved portion 130 in conformity to the outer diameter of the ball 126.

When each ball 126 is to be retained in each pocket 129, the ball 126 is inserted into the pocket 129 from the opening at the other end, and then caulking is performed for reducing the inner diameter of the opening at the other end by pressing a punch at a position indicated by the solid line a in FIG. 9. As a result, the diameters of the openings at both ends of each pocket 129 is shorter than the outer diameter of the ball 126, so that the ball 126 will not drop from the pocket 129.

Another toroidal type continuously variable transmission of the present invention improves the thrust bearings 125 for supporting thrust loads applied to the respective power rollers 109 to achieve reduction in weight and improvement in performance of the transmission.

Since each of the thrust bearings 125 in the conventional structure as described above has the metal retainer 127 incorporated therein, it implies problems that not only the weight is extremely heavy, but also assembly thereof is complicated, e.g., because of the caulking required to prevent the balls 126 from dropping from the respective pockets 129, which results in a raised manufacturing cost.

Further, for taking a caulking margin, a wide space, to some degree, must be ensured between adjacent two pockets 129. Therefore, if the diameters of the balls 126 are assumed to be equal, the number of the pockets 129 and the balls 126 are reduced due to such spaces for the caulking. For providing the same number of balls, the diameter of the balls 126 must be reduced in correspondence to the caulking margins. As the number of the balls 126 is reduced or as the diameter of the same is shorter, a load capacity of each thrust bearing 125 is decreased, resulting in reducing a torque which can be transmitted by a toroidal type continuously variable transmission having the thrust bearings 125 incorporated therein.

Particularly, when the retainer 127 is made of a metal, a slight gap is required between the inner surface of each pocket 129 and the outer surface of the ball 126 accommodated therein. For this reason, the rotation of the balls 126 is guided by a so-called trajectory wheel guiding which is based on the trajectory along which the balls 126 are rolling in contact therewith.

In operation of the toroidal type continuously variable transmission, each of the power rollers 109 receives large loads at two circumferential points by an input side disk 102 and an output side disk 104. As a result, loads applied to each of the thrust bearings 125 become unequal over the circumferential direction. Thus, each of the trunnions 106 is elastically deformed by a large load received from the corresponding power roller 109, whereby the shape of the trajectory is also deformed slightly from a true circle to an ellipse.

If the balls 126 rotate together with the retainer 127 while the trajectory remains deformed in an elliptical shape, the balls loosely retained in the pockets 129 roll along the elliptically deformed trajectory. In other words, a so-called whirling phenomenon occurs. Such a whirling phenomenon, if occurs, may easily cause the trajectory to be unequally rubbed and noise and vibration to be generated during operation.

SUMMARY OF THE INVENTION

It is an object of the present invention to provide a toroidal type continuously variable transmission which exhibits excellent transmission performance and durability.

It is another object of the present invention to provide a toroidal type continuously variable transmission which is compact and excellent in durability.

It is a further object of the present invention to provide a toroidal type continuously variable transmission which is light, high-performance, and manufactured at a low cost.

A toroidal type continuously variable transmission according to a first aspect of the present invention comprises, similarly to the foregoing conventional toroidal type continuously variable transmission, an input shaft; an input side disk having one side surface in the axial direction, the cross-section of which is made arcuate to constitute an input side concave surface, and arranged for rotation by the rotation of the input shaft; an output side disk having one side surface in the axial direction, the cross-section of which is made arcuate to constitute an output side concave surface, and supported coaxially with the input shaft for rotation relative to the input shaft, in a state where the output side concave surface is opposite to the input side concave surface; a plurality of trunnions, arranged for swing motion about pivots located at twisted positions with respect to the input shaft; displacement shafts each fixedly supported by each trunnion at a base end thereof; outer rings each arranged around the base end of each displacement shaft; and annular power rollers each rotatably supported at a distal end of each displacement shaft, wherein each power roller having a spherical surface portion which abuts the input side concave surface and the output side concave surface and a cylindrical surface portion for processing the spherical surface portion on its outer peripheral face, as well as a trajectory (race) for abutting the plurality of rolling bodies in one side face thereof.

Particularly, the toroidal type continuously variable transmission of the present invention is characterized in that an outer diameter of the cylindrical surface portion is shorter than an inscribed circle diameter of the plurality of rolling bodies, and the cylindrical surface portion constitutes part of one side face and is located at a position inside the position of the trajectory.

The action per se performed by the toroidal type continuously variable transmission of the present invention for arbitrarily changing a transmission gear ratio is similar to that of the foregoing conventional toroidal type continuously variable transmission.

Particularly, with the toroidal type continuously variable transmission of the present invention, it is possible to polish the spherical surface portion by industrial techniques while ensuring a sufficient length of the bus line of the spherical surface portion of the power roller. For this reason, a part of the outer peripheral face of the power roller other than the spherical surface portion will not come in contact with the input side concave surface and the output side concave surface, whereby the respective concave surfaces are free from damage due to excessive stresses applied thereto.

A toroidal type continuously variable transmission according to a second aspect of the present invention comprises, similar to the foregoing conventional toroidal type continuously variable transmission, an input side disk arranged for rotation together with an input shaft; an output side disk supported for rotation relative to the input side disk; a trunnion arranged for swing motion about pivots located at twisted positions with respect to the input side and output side disks; a displacement shaft supported by the trunnion at a base end thereof; a power roller rotatably supported at a distal end of the displacement shaft through a radial bearing and sandwiched between the input side and output side disks; and a thrust bearing arranged between one side face of the trunnion and an end face of the power roller. Inner side faces of the input side and output side disks, opposite to each other, have their respective cross-sections formed in arcuate concave surfaces, and the peripheral face of the power roller is formed in a spherical convex surface, such that the peripheral face of the power roller abuts the inner side faces of the input side and output side disks. The thrust bearing comprises an annular outer ring opposite to one side face of the trunnion; a plurality of balls arranged between the outer ring and the end face of the power roller such that the balls can freely roll; and a retainer for retaining the plurality of balls therein such that the balls can freely roll.

Particularly, this toroidal type continuously variable transmission of the present invention is characterized in that the retainer is made by integrally molding synthetic resin having elasticity and has a plurality of pockets for retaining the balls one by one therein at positions equally spaced in the circumferential direction such that the balls can freely roll in the respective pockets, and each pocket is provided at an opening thereof with a plurality of pawls for resiliently pressing the outer peripheral face of the ball retained in the pocket.

The actions per se performed by the toroidal type continuously variable transmission of the present invention for transmitting a rotating force between the input shaft and the output shaft and for changing a transmission gear ratio between the input shaft and the output shaft are similar to those of the foregoing conventional structure.

Particularly, with this toroidal type continuously variable transmission of the present invention, since the retainer of the thrust bearing for supporting a thrust load applied to the power roller is made of synthetic resin, the number of assembling processes can be reduced, while the diameter of the balls can be longer or the number of balls can be increased, thereby providing a larger load capacity for thrust loads.

Further, the respective balls are retained in pockets of the retainer without jounce, so that the respective balls are guided by the retainer to roll on a true circle. Thus, a whirling phenomenon of the balls does not easily occur even if the trajectory is deformed.

DESCRIPTION OF THE PREFERRED EMBODIMENTS

A toroidal type continuously variable transmission according to one embodiment of the present invention may be constructed, for example, similarly to the conventional toroidal type continuously variable transmission described above. In such a construction, as shown in FIGS. 2A and 2B, rotation of an input shaft 1 is transmitted to an input side disk 2, for example, by the action of a pressurizing unit 8 and so on. One side face in the axial direction (the right side face in FIGS. 2A and 2B) of the input side disk 2 has an arcuate cross-section which constitutes an input side concave surface 2a. An output side disk 4, one side face in the axial direction (the left side face in FIGS. 2A and 2B) of which has an arcuate cross-section which constitutes an output side concave surface 4a, is supported coaxially with the input shaft 1, in a state where the output side concave surface 4a and the input side concave surface 2a are opposite to each other, for rotation relative to the input shaft 1.

A plurality of trunnions 5 are arranged for swing motion about pivots 16 located at twisted positions with respect to the input shaft 1. Displacement shafts 6 are fixedly supported at respective base ends thereof by the respective trunnions 5. Each of the displacement shafts 6 is provided with an annular outer ring 14 around the base end thereof. At the top end of each of the displacement shafts 6, there is rotatably supported a spherical power roller 7. In accordance with the present invention as shown in FIG. 1, a plurality of rolling bodies 17 are arranged between each of the power rollers 7 and each of the outer rings 14 such that these rolling bodies 17 can freely roll. Between each power roller 7 and each outer ring 14, there is provided an annular retainer 15 for rotatably retaining the plurality of rolling bodies 17 so as to allow the rolling bodies 17 to freely roll.

A structure of the toroidal type continuously variable transmission of the embodiment which should be particularly noted is that the outer peripheral face of each power roller 7 is formed of a spherical surface portion 18 and a cylindrical surface portion 19 continuous from this spherical surface portion 18. The spherical surface portion 18 is made free to abut the input side concave surface 2a and the output side concave surface 4a in a state where a torque can be freely transmitted. The cylindrical surface portion 19 is continuous from a larger diameter side of the spherical surface portion 18. The cylindrical surface portion 19 constitutes a cylindrical surface parallel to the center axis of the power roller 7 which includes this cylindrical surface portion 19 on its outer peripheral face 7a, that is, the displacement shaft 6.

The outer diameter D of the cylindrical surface portion 19 is selected to be longer than the outer diameter $d_{15}$ of the retainer 15 and the outer diameter $d_{14}$ of the outer ring 14 ($D > d_{15}, d_{14}$) such that the cylindrical surface portion 19 of the power roller 7 protrudes to the most extent outwardly in the diametrical direction out of the members 7, 14, 15 which are all supported around the displacement shaft 6. It should be noted that if the continuous portion between the end of the larger diameter side of the spherical surface portion 18 and the cylindrical surface portion 19 is bent and protrudes outwardly, the sharp bent tip may scratch the input side and output side concave surfaces 2a, 4a of the input side and output side disks 2, 4. For this reason, it is preferable that the continuous portion be smoothly coupled to a curved surface having a relatively small radius of curvature, compared with the spherical surface portion 18.

The action per se performed by the toroidal type continuously variable transmission of this embodiment, constructed as described above, for arbitrarily changing the transmission gear ratio between the input shaft and the output shaft is similar to the aforementioned conventional toroidal type continuously variable transmission.

It should be particularly noted for the toroidal type continuously variable transmission of this embodiment that, for polishing the spherical surface portion 18 of the power roller 7, the cylindrical surface portion 19 can be utilized as a reference level, so that the spherical surface portion 18 of the outer peripheral face 7a is readily finished in a precise spherical convex surface by an industrial mass-production technique, for example, a magnet shoe type or the like.

Also, since the outer peripheral faces of the outer ring 14 and the retainer 15 are located inside of the cylindrical surface portion 19 of the outer peripheral face of the power roller 7 in the diametrical direction of the displacement shaft 6, the outer peripheral face of the outer ring 14 or the retainer 15 will not come in contact with the input side concave surface 2a or the output side concave surface 4a, even if the displacement shaft 6 more or less displaces during operation of the toroidal type continuously variable transmission.

The toroidal type continuously variable transmission of this embodiment, constructed and operated as described above, which exhibits excellent transmission performance and durability, can be manufactured by industrial techniques.

Figure 3:
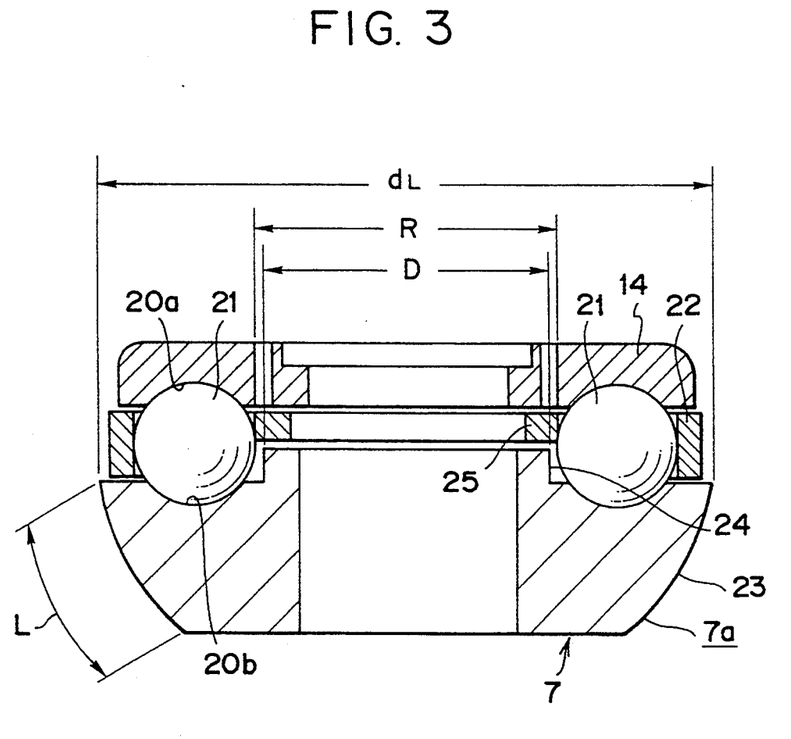
FIG. 3 is a cross-sectional view showing a power roller incorporated in a toroidal type continuously variable transmission according to the present invention together with a thrust bearing.

FIG. 3 shows another embodiment of the present invention. It should be noted that the toroidal type continuously variable transmission of this embodiment is characterized by the shape of a power roller, and the basic structure thereof is similar to the conventional structure shown in FIGS. 2A and 2B, so that repetitive explanation thereon will be omitted.

One face (the lower face in FIG. 3) of an annular outer ring 14 disposed around a base end of a displacement shaft 6 (such as that shown in FIGS. 2A and 2B) and one side face (the upper face in FIG. 3) of an annular power roller 7 rotatably supported by the top end of the displacement shaft 6, which are opposite to each other in an assembled state, are formed with trajectories (races) 20a, 20b, respectively. Then, between the trajectories 20a, 20b, a plurality of balls 21 are arranged such that they can freely roll, to constitute a thrust bearing for supporting a thrust load applied to the power roller 7. Each of the balls 21 is retained by a retainer 22 made of synthetic resin such that they can freely rotate.

In an outer peripheral face 7a of the power roller 7, there are formed a spherical surface portion 23 which abuts an input side concave surface 2a of an input side disk 2 and an output side concave surface 4a of an output side disk 4 (such as those shown in FIGS. 2A and 2B), and a cylindrical surface portion 24 which is used in forming this spherical surface portion 23.

In the toroidal type continuously variable transmission of this embodiment, the outer diameter D of the cylindrical surface portion 24 is selected to be shorter than the inscribed circle diameter R of the plurality of balls 21 ($D < R$). Additionally, this cylindrical surface portion 24 is located on an inner peripheral edge portion of the one side surface of the power roller 7 and inside the position of the trajectory 20b.

With the formation of the side face of the power roller 7, an inner peripheral portion 25 of the retainer 22 is made thinner so as to prevent interference between the retainer 22 and the cylindrical surface portion 24.

With the toroidal type continuously variable transmission of this embodiment constructed as described above, it is possible to grind the spherical surface portion 23 by industrial techniques while ensuring a sufficient length L of the bus line of the spherical surface portion 23 of the power roller 7.

More specifically, when the spherical surface portion 23 is formed by using a processing machine such as a grinding machine, the processing is performed thereon while the cylindrical surface portion 24 is being held by a shoe type holder. In the case of the power roller 7 to be incorporated in the toroidal type continuously variable transmission of this embodiment, since the cylindrical surface portion is located inside the positions of the balls 21, the length L of the bus line of the spherical surface portion 23 can be made longer as compared with the conventional structure shown in FIG. 4 in which the cylindrical surface portion 18 is arranged to be continuous from the end of the larger diameter side of the spherical surface portion 17.

In the present invention, by virtue of the longer bus line, a larger torque can be transmitted. Also a contact ellipse, in which the spherical surface portion 23 comes in contact with the input side concave surface 2a and the output side concave surface 4a, does not include part on the outer peripheral face of the power roller 7 other than the spherical surface portion 23. As a result, the respective concave surfaces 2a, 4a are not damaged due to excessive stresses applied thereto. Further, since the cylindrical surface portion 24, which is held during processing, is located inside the positions of the balls 21, the total thickness of the power roller 7 and the thrust bearing will not be excessively large.

Since the length of the bus line of the spherical surface portion 23 can be extended from 1 to L by removing the cylindrical surface portion 38 shown in FIG. 4, a maximal outer diameter constituted of the end face of the power roller 7 can be extended from $d_s$ to $d_L$. Consequently, the pitch diameter of the balls 21 can be made larger, so that the diameter of the balls 21 can be longer or the number of balls 21 can be increased, thereby providing a larger load capacity of the thrust bearing. Thus, this embodiment allows the power roller 7 of the same size to transmit a larger torque.

The toroidal type continuously variable transmission of this embodiment constructed and operated as described above, which is compact and excellent in durability, can be manufactured by industrial techniques.

FIGS. 5 to 8 show a further embodiment of the present invention. The toroidal type continuously variable transmission of this embodiment is characterized by a material and shape of a retainer which is incorporated in a thrust bearing 125 for supporting thrust loads applied to power rollers 109 (FIG. 12). The rest of the structure and actions of this embodiment are similar to those of the aforementioned conventional type, so that repetitive explanation thereon will be omitted, and the characterizing portions of the embodiment will only be described.

A retainer 132, which is integrally made by injection-molding synthetic resin having elasticity, is formed with an outer vertical wall 135 over the entire outer peripheral edge of a disk-like substrate 134 and with an inner vertical wall 136 over the entire inner peripheral edge of the same in order to increase the section modulus, thus maintaining the strength of the substrate 134. A plurality of (nine in the shown example) pockets 133 are formed in the substrate 134 at positions equally spaced in the circumferential direction. Also, on the peripheral edge of each pocket 133 on the same side of the respective vertical walls 135, 136, there is formed a protrusion 137 lower than the vertical walls 135, 136 over the entire circumference of the pocket 133. It should be noted that the thickness of the outer vertical wall 135 in the diametrical direction is made sufficiently large so as to maintain an appropriate strength against centrifugal forces. On the other hand, the thickness of the inner vertical wall 136 in the diametric direction is made small so as to prevent the occurrence of foam and defective molding such as surface sink during an injection-molding process of synthetic resin.

Figure 5:
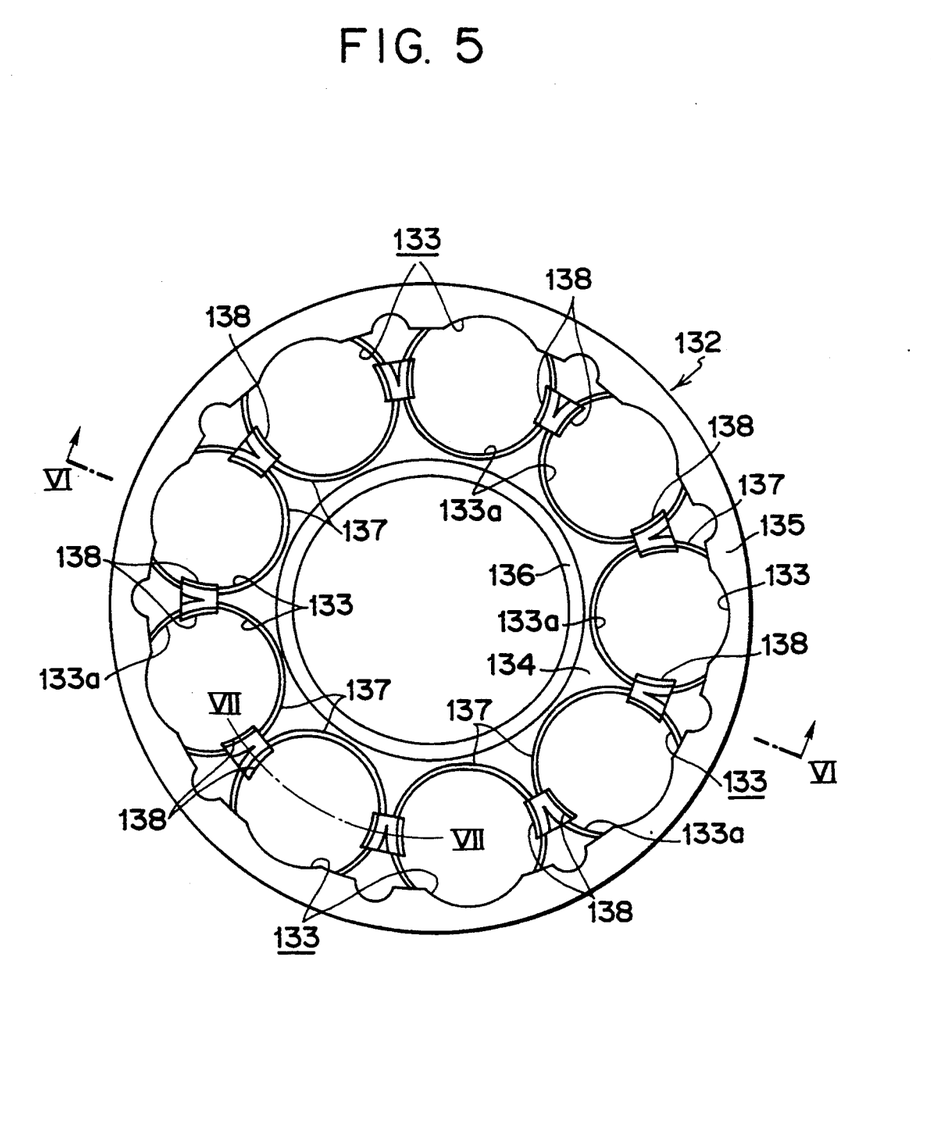
FIG. 5 is a plan view of a retainer showing an embodiment of the present invention.
Figure 6:
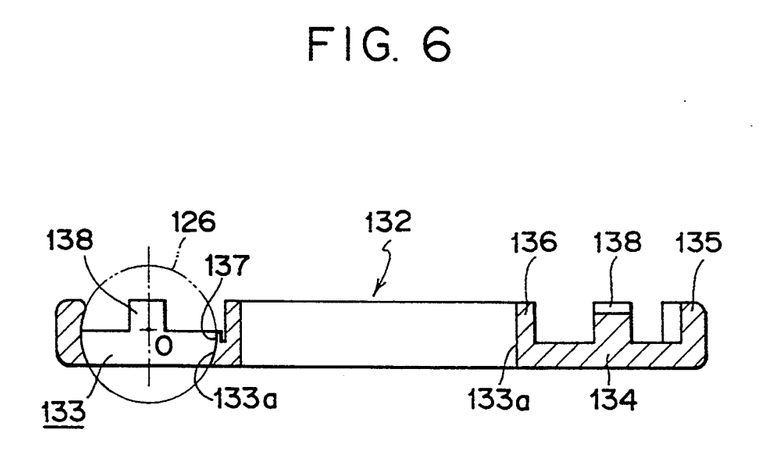
FIG. 6 is a cross-sectional view taken along the line VI—VI FIG. 5.

A circularly formed inner surface 133a of each pocket 133 and an inner surface of each protrusion 137 smoothly continuous from the inner surface 133a are formed in a spherical plane which substantially coincides with the outer surface of the ball 126 to be retained in the pocket 133, so that balls 126 are retained one by one in the pockets 133 such that they can freely roll therein. The center O of the curvature (FIG. 6) of the inner surface 133a, however, protrudes from the upper side face of the substrate 134 in the direction of forming the vertical walls 135, 136. The inner diameter of each pocket 133, therefore, becomes gradually shorter from the opening on the side of the protrusion 137 to the opposite opening.

Figure 7:
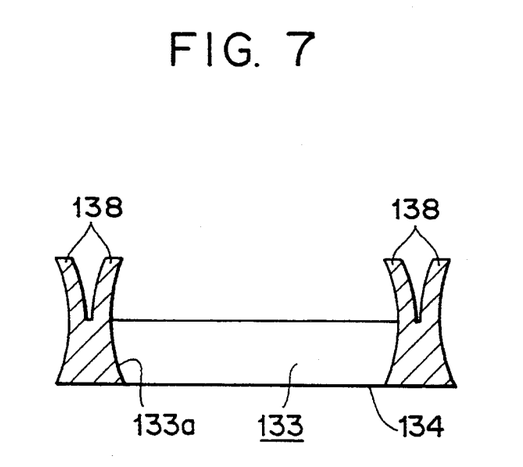
FIG. 7 is an enlarged cross-sectional view taken along the line VII—VII of FIG. 5.
Figure 8:
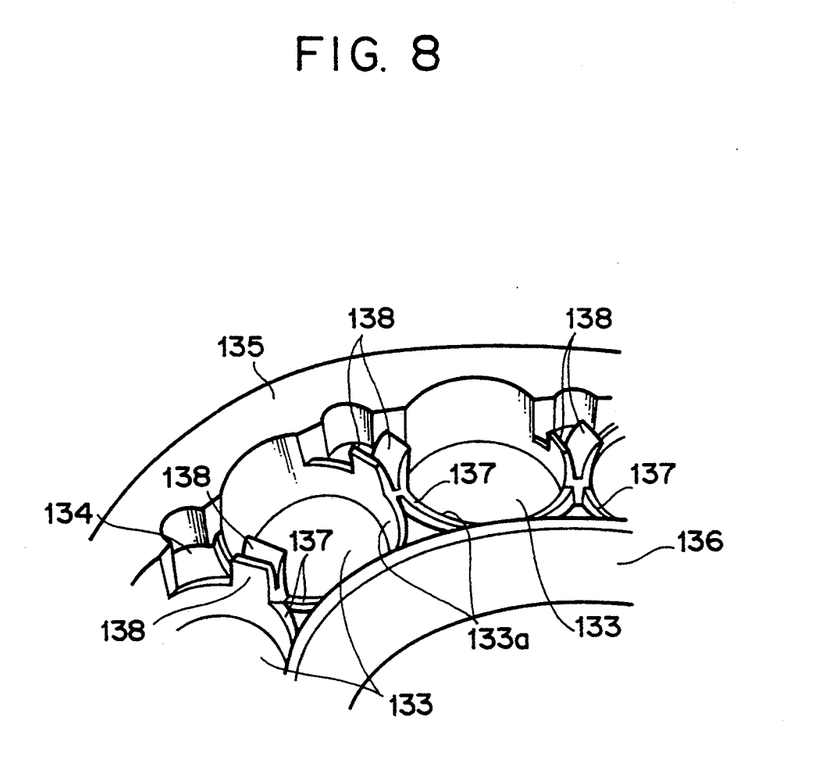
FIG. 8 is an enlarged perspective view showing part of the retainer of FIG. 5.

Further, in the opening of each pocket 133, there are provided a pair of pawls 138 at diametrically opposite positions of the protrusion 137. Each of the pawls 138 is curved in the direction approaching the central axis of the pocket 133 toward the tip thereof. Therefore, each ball 126, retained in the pocket 133, is resiliently pressed on the outer peripheral face thereof by the pair of pawls 138.

More specifically, when the ball 126 is to be accommodated in each pocket 133, the ball 126 is first opposed to the opening of the pocket 133 where the pair of pawls 138 are provided. Then, the ball is pressed into the pocket 133 by force. As a result, the space between the pawls is resiliently extended to allow the ball 126 to enter the pocket 133. After the ball 126 has been accommodated in the pocket 133, the pair of pawls 138 are resiliently restored and press down the outer surface of the ball 126. In this state, the ball 126 is retained in the pocket 133 without jounce.

With the toroidal type continuously variable transmission of this embodiment incorporating the thrust bearing 125 (FIG. 12) provided with the retainer 132 constructed as described above, the number of assembly processes can be reduced, and sufficient diameter and number of the balls 126 are ensured to provide the thrust bearing 125 with a sufficient load capacity for thrust loads.

In summary, the process of accommodating the balls 126 in the retainer 132 only requires facing each ball 126 to the pocket 133 and pressing the ball 126 into the pocket 133. After the ball 126 has been accommodated in the pocket 133, the ball 126 is prevented from inadvertently dropping from the pocket 133 by the action of the pair of pawls 138.

Thus, the caulking process required to the assembly of the conventional structure can be omitted, so that the assembling processes can be simplified. Additionally, since the caulking margin is not necessary between adjacent two pockets 133, a distance between adjacent two pockets 133 can be shortened, and a sufficient diameter and the number of balls 126 can be ensured.

Further, by the action of the pair of pawls 138, each ball 126 is retained in the pocket 133 of the retainer 132 without jounce. Therefore each of the balls 126, which are guided by the retainer 132, rolls in a true circle. Thus the whirling phenomenon of the balls is prevented from occurring even if the trajectory is deformed.

The toroidal type continuously variable transmission of this embodiment constructed and operated as described above, which is light-weight and high-performance, can be manufactured at a low cost.

What is claimed is:

1. A toroidal type continuously variable transmission comprising:

an input shaft;
an input side disk having one side surface in the axial direction, the cross-section of which is made arcuate to form an input side concave surface, and mounted for rotation by said input shaft; an output side disk having one side surface in the axial direction, the cross-section of which is made arcuate to form an output side concave surface, and supported coaxially with said input shaft for rotation relative to said input shaft, said output side concave surface opposing said input side concave surface;
a plurality of trunnions, arranged for swing motion about pivots located at twisted positions relative to said input shaft;
a plurality of displacement shafts each fixedly supported by a corresponding trunnion at a base end thereof;
a plurality of outer rings each arranged around the base end of a corresponding displacement shaft and having a first race on one side;
a plurality of annular power rollers each rotatably supported at a distal end of a corresponding displacement shaft and having a second race on a surface opposing the corresponding first race, a convex surface portion which abuts said input side concave surface and said output side concave surface, and a cylindrical surface portion protecting from said surface having said second race, said cylindrical surface portion being disposed inwardly of said second race and having an outer diameter smaller than an inscribed circle diameter of a plurality of rolling bodies disposed in said second race and the corresponding first race; and
a respective retainer disposed between each annular power roller and the corresponding outer ring for holding the corresponding plurality of rolling bodies, the retainer having an inner circumferential portion disposed between the cylindrical surface portion of the corresponding power roller and the corresponding outer ring, a thickness of said inner circumferential portion being smaller than that of an outer circumferential portion of said retainer.

2. A toroidal type continuously variable transmission according to claim 1, wherein an outer diameter of the annular power roller is larger than outer diameters of said retainer and said outer ring.

3. A toroidal type continuously variable transmission comprising:
- an input side disk arranged for rotation together with an input shaft and having a concave surface;
- an output side disk supported for rotation relative to said input side disk and having a concave surface opposing the concave surface of said input disk;
- a trunnion arranged for swing motion about a pivot located at a twisted position relative to said input side and output side disks;
- a displacement shaft supported by said trunnion at a base end thereof;
- a power roller rotatably supported at a distal end of said displacement shaft through a radial bearing, a convex surface of said power roller abutting the concave surfaces of said input side and output side disks; and
- a thrust bearing arranged between one side face of said trunnion and an end face of said power roller, said thrust bearing including an annular outer ring opposite to said one side face of said trunnion, a plurality of balls rollingly arranged between said outer ring and the end face of said power roller, and a retainer for retaining said plurality of balls therein such that said balls can freely roll,
- wherein said retainer is an integral elastic synthetic resin molding having a plurality of pockets respectively retaining said balls at positions equally spaced in the circumferential direction such that said balls can freely roll in said pockets, and each pocket has a plurality of resiliently deformable pawls protecting outwardly from an open end of said pocket to retain the corresponding ball in said pocket.

4. A toroidal type continuously variable transmission according to claim 3, wherein the pawls of said plurality of pockets are all located on the same side of the retainer.

5. A toroidal type continuously variable transmission according to claim 4, wherein pawls of two adjacent pockets define a resilient V-shape structure such that the pawl adjacent to one pocket is resiliently pressed toward the pawl of the adjacent pocket when a ball is being inserted into said one pocket and returns to its original position after the insertion of the ball.

* * * * *